US012681423B2

(12) United States Patent
Kawasumi et al.

(10) Patent No.: US 12,681,423 B2
(45) Date of Patent: Jul. 14, 2026

(54) IMAGE FORMING APPARATUS AND PROCESSING UNIT

(71) Applicant: CANON KABUSHIKI KAISHA, Tokyo (JP)

(72) Inventors: Ryoichi Kawasumi, Ibaraki (JP); Yusuke Mitsui, Yamanashi (JP); Koji Kanda, Yamanashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 18/901,567

(22) Filed: Sep. 30, 2024

(65) Prior Publication Data

US 2025/0123586 A1 Apr. 17, 2025

(30) Foreign Application Priority Data

Oct. 13, 2023 (JP) ................................ 2023-177404

(51) Int. Cl.
*G03G 21/16* (2006.01)
*G03G 15/00* (2006.01)

(52) U.S. Cl.
CPC ......... *G03G 21/1647* (2013.01); *G03G 15/80* (2013.01); *G03G 21/1652* (2013.01); *G03G 2221/1654* (2013.01); *G03G 2221/166* (2013.01)

(58) Field of Classification Search
CPC ............... G03G 15/6582; G03G 15/80; G03G 21/1619; G03G 21/1647; G03G 21/1652; G03G 2221/1654; G03G 2221/166
See application file for complete search history.

(56) References Cited

U.S. PATENT DOCUMENTS

| | | | | |
|---|---|---|---|---|
| 7,298,987 B2 * | 11/2007 | Tokishige | G03G 21/1652 399/107 |
| 2016/0167249 A1 * | 6/2016 | Yoshida | B65H 35/0086 83/167 |
| 2018/0179012 A1 * | 6/2018 | Tsuji | G03G 21/1619 |
| 2022/0260942 A1 * | 8/2022 | Furusawa | G03G 15/2017 |

FOREIGN PATENT DOCUMENTS

| | | |
|---|---|---|
| JP | 2001328758 A | 11/2001 |
| JP | 2014108842 A | 6/2014 |
| JP | 2022071546 A | 5/2022 |

* cited by examiner

*Primary Examiner* — Sophia S Chen
(74) *Attorney, Agent, or Firm* — ROSSI, KIMMS & McDOWELL LLP

(57) ABSTRACT

Disclosed is an image forming apparatus includes a main unit, and a processing unit installed on an installation surface of the main unit and configured to process a sheet discharged from a discharge portion in a first direction. The processing unit includes a first connector electrically connected to the main unit, and a first guide pin extending in a second direction crossing the first direction. The main unit includes a second connector electrically connected to the processing unit in a manner the first connector is inserted along the second direction, and a first guide hole the first guide pin passing through the first guide hole. At least a part of the first guide pin is disposed in a position different from a position of the second connector in a third direction crossing both the first direction and the second direction.

13 Claims, 14 Drawing Sheets

IMAGE FORMING APPARATUS AND PROCESSING UNIT

BACKGROUND OF THE INVENTION

Field of the Invention

This invention relates to an image forming apparatus provided with a connector that can be connected to a processing unit that performs processes for a sheet discharged from the apparatus main body and a processing unit.

Description of the Related Art

In a conventional image forming apparatus of electrophotographic system, the processing units that performs various processes for the sheet can be attached to the apparatus. The processes include stitching the sheet with a staple, making a hole on the sheet with a punch, folding the sheet, and only conveying the discharged sheet.

Japanese Patent Application Laid-Open No. 2014-108842 discloses the configuration of an image forming apparatus, in which a finisher capable of stacking a large amount of sheets is disposed at a side surface of the main body of the image forming apparatus and a buffer path unit attached for relaying and conveying the sheet from a discharge opening of the apparatus main body to the finisher. This buffer path unit is a processing unit described above.

This buffer path unit is attached to the apparatus main body by being inserted in the direction from the front side towards the back side of the image forming apparatus. For this purpose, the buffer path unit has a drawer connector provided on a tip portion (back side) in the inserting direction. According with the buffer path unit being inserted, a connector on the buffer path unit side fits into the connector on the apparatus main body side disposed in a position located on the back side of the apparatus main body to make an electrical connection with the apparatus main body.

However, in the apparatus of Japanese Patent Application Laid-Open No. 2014-108842, it is difficult to visually inspect the positions of the connector on the apparatus main body side and the connector on the unit side when the unit is attached to the apparatus main body. This makes difficult the fitting of the connector on the unit side into the connector on the apparatus main body, and accordingly it might be possible that the electrical connection between the unit and the apparatus main body is not properly performed.

SUMMARY OF THE INVENTION

A representative configuration of the present invention is an image forming apparatus comprising:

- a main unit including an image forming portion configured to form an image on a sheet;
- a discharge portion provided on the main unit and configured to discharge the sheet from the main unit in a first direction; and
- a processing unit installed on an installation surface of the main unit and configured to process the sheet discharged from the discharge portion, wherein the processing unit includes:

- a first connector electrically connected to the main unit; and
- a first guide pin that extends in a second direction crossing the first direction in a state where the processing unit is installed on the installation surface, wherein the main unit includes:

- a second connector disposed, in the second direction, on a first side with respect to a sheet discharging position onto which the sheet is discharged from the discharge portion, the second connector being electrically connected to the processing unit in a manner that the first connector is inserted into the second connector along the second direction; and
- a first guide hole disposed on the first side with respect to the sheet discharging position in the second direction, the first guide pin passing through the first guide hole, and wherein at least a part of the first guide pin is disposed in a position different from a position of the second connector in a third direction crossing both the first direction and the second direction.

Further features of the present invention will become apparent from the following description of exemplary embodiments with reference to the attached drawings.

DESCRIPTION OF THE EMBODIMENTS

Figure 1:
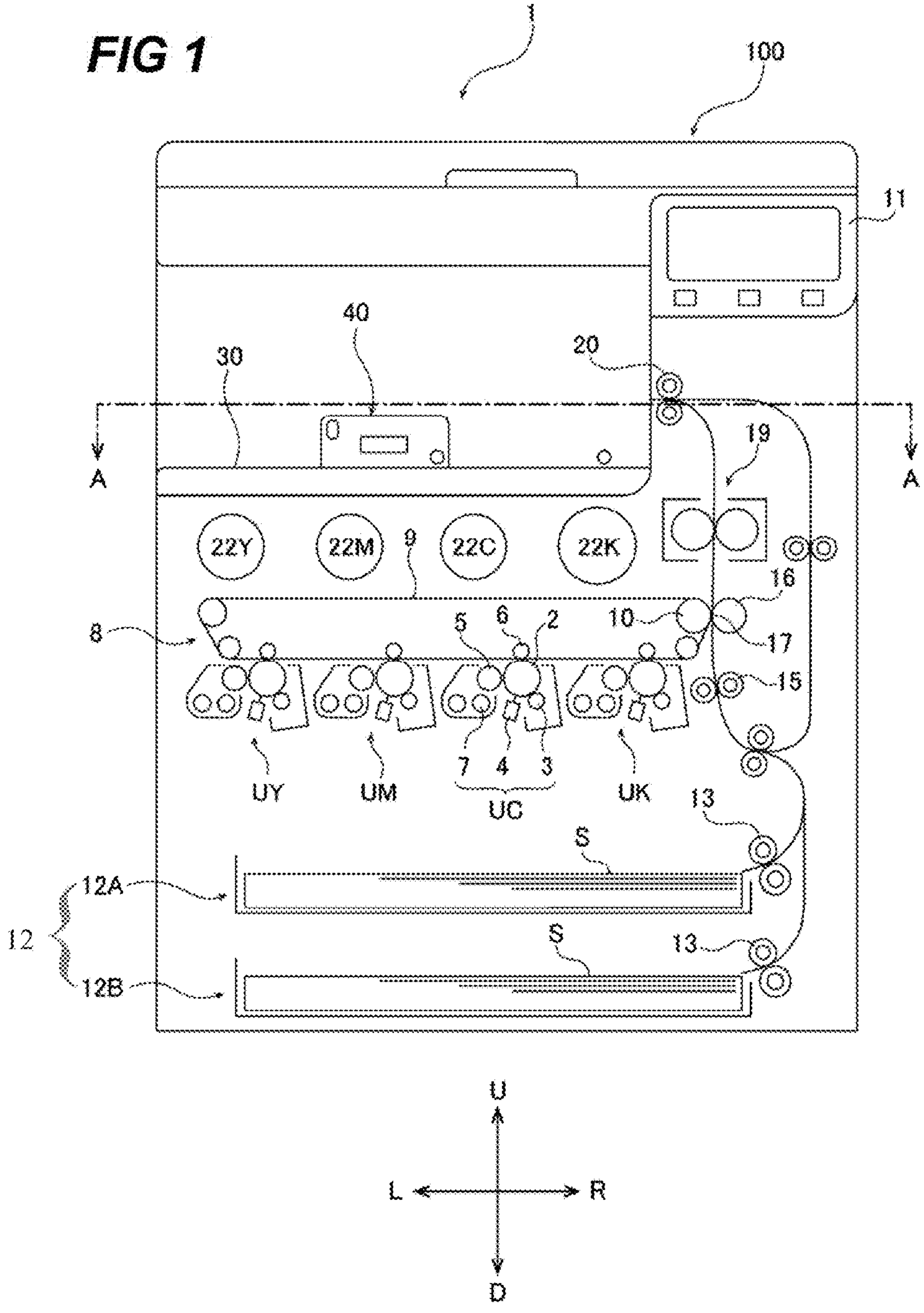
FIG. 1 is a schematic diagram showing a cross-sectional view of an image forming apparatus.

Hereinafter, with reference to the drawings, preferred embodiments of the present invention will be described in detail. However, the dimensions, materials, and relative positions of the components of the image forming apparatus described in the following is not intended to limit the scope of the invention to them alone. In the figures, the components to which the same reference character is attached have the same configuration or the effect and the duplicate description of these components is omitted as appropriate.

In the following description, the upward direction U, the downward direction D, the rightward direction R, the leftward direction L, the backward direction B, the forward direction F shown in FIG. 1 (and so on) are defined as follows. The side of the image forming apparatus 1 shown in FIG. 1 (and so on) on which the operation portion 11 is disposed is defined as front side and the opposite side of the front side is defined as back side. The direction from the back surface to the top surface of the drawing sheet is defined as forward direction, and the direction from the top surface to the back surface of the drawing sheet is defined as backward direction. With respect to the image forming unit UK that forms a black image, the side on which the image forming unit UY that forms a yellow image is disposed is defined as left side. With respect to the image forming unit UY that forms a yellow image, the side on which the image forming unit UK that forms a black image is disposed is defined as right side. The direction that is perpendicular to the forward/backward directions and the rightward/leftward directions and that is a vertical upward direction is defined as upward direction. The direction that is perpendicular to the forward/backward directions and the rightward/leftward directions and that is a vertical downward direction is defined as downward direction.

Further, in the following, the leftward/rightward directions are referred to as first directions, the forward/backward directions are referred to as second directions perpendicular to the first directions, the upward/downward directions are referred to as third directions perpendicular to the first directions and second directions.

(Image Forming Apparatus)

The image forming apparatus 1 will be described using FIG. 1 FIG. 1 is a schematic diagram showing a cross-sectional view of image forming apparatus according to the present embodiment viewed from the front side.

The image forming apparatus 1 shown in FIG. 1 is a four full color laser printer of tandem and intermediate transfer system using electrophotographic process as an example of an image forming apparatus. The image forming apparatus 1 forms a toner image on the sheet S based on the image information input to a control circuit portion (not shown) from an external host device (not shown) such as a personal computer.

At the substantially central portion of the apparatus main body 100 that is a main unit of the image forming apparatus 1, the image forming portions that sequentially form the toner images of yellow (Y), magenta (M), cyan (C) and black (B) are disposed.

The image forming units UY, UM, UC and UK as image forming portions that form toner images of respective colors have the substantially the same configuration as each other. To avoid complexity of the drawings, reference characters are attached only to the components of the image forming unit UC for the color cyan as a representative, and the reference characters for the other image forming unit UY, UM and UK are omitted.

Each of the four image forming unit UY, UM, UC and UK has a drum unit with the electrophotographic photosensitive body (hereinafter referred to as a photosensitive drum) 2 of a rotating drum type as an image bearing member, and the developing sleeve 5 that develops into a toner image. Each image forming unit is detachably attachable to the apparatus main body 100 as a main unit of the image forming apparatus 1 for exchange.

The drum unit has the photosensitive drum 2, the charging roller 3 that charges the photosensitive drum 2, a drum cleaning portion (not shown).

The developing unit has the developing sleeve 5 and the screw 7 that provides toner to the developing sleeve 5 and stirs the toner.

Between the drum unit and the developing unit, the LED exposure unit 4 having LED elements is disposed.

Above the four image forming units UY, UM, UC and UK, the intermediate transfer belt unit 8 is disposed. The intermediate transfer belt unit 8 has the four primary transfer rollers 6 that are respectively opposed to the photosensitive drums 2 of respective colors, and the belt 9.

Under the four image forming units UY, UM, UC and UK, the sheet cassette unit 12 is disposed. The sheet cassette unit 12 includes the sheet cassette 12A disposed at a upper row and the sheet cassette 12B disposed at a lower row.

Above the intermediate transfer belt unit 8, the toner bottles 22Y, 22M, 22C and 22K are disposed. The toner bottles 22Y, 22M, 22C and 22K are detachably attachable to the main body for exchange and accommodate replenishing toner for the four image forming units UY, UM, UC and UK. Toner replenishment with proper amount at proper timing is performed from the corresponding toner bottles 22Y, 22M, 22C and 22K to the image forming units UY, UM, UC and UK, respectively, by a toner replenishing mechanism (not shown).

(Image Forming Process)

In the image forming process, latent images are respectively formed on the photosensitive drums 2 of the four image forming units UY, UM, UC and UK. Prior to this, as a preparatory operation, a high voltage is applied to the charging roller 3 pressed onto the photosensitive drum 2 so that the surface of the photosensitive drum 2 are uniformly charged according to the rotation of the photosensitive drum 2.

Next, a high voltage is applied to the developing sleeve 5 by way of a different path from that to the charging roller 3 so that the toner having electric charge inside the developing unit is coated on the surface of the developing sleeve 5. Inside the developing unit, the toner is conveyed and circulated at a high speed by the screw 7. The rotational speed of the screw 7 is relatively much higher than those of the developing sleeve 5 and the photosensitive drum 2 so that the coating of the toner to the developing sleeve 5 is uniformly performed without unevenness.

By the irradiation of the LED of the LED exposure unit 4 disposed between the drum unit and the developing unit, an electrostatic latent image is formed by a potential change on the surface of the photosensitive drum 2. The electrostatic latent image on the photosensitive drum 2 is developed into a toner image with toner on the developing sleeve 5.

The toner image on the photosensitive drum 2 is primarily transferred onto the surface of the belt 9 in the order of the colors described above according to the rotation of the belt 9 as an intermediate transfer member. As a result, the toner image in which four colors of Y, M, C and K are superimposed is formed on the belt 9.

On the right side of the apparatus main body 100 of the image forming apparatus 1, a sheet conveying path is disposed for conveying the sheet S from the lower position to the upper position. On the sheet conveying path, the feeding roller pair 13, the registration roller pair 15, the secondary transfer roller 16, the fixing device 19, the discharge roller pair 20 are sequentially disposed from the lower side toward the upper side. The secondary transfer roller 16 is abutted to the belt driving roller 10 on the right side of the intermediate transfer belt unit 8 via the belt 9 with a predetermined pressing force to form a secondary transfer nip portion 17 together with the belt 9.

Then, at a predetermined control timing, the feed roller pair 13 is driven and the sheets (recording materials, sheets of paper) S are separated and fed one sheet by one sheet from the sheet cassette unit 12 to be introduced into the sheet conveying path. The separated sheet S is then at a predetermined control timing introduced into the second transfer nip portion 17 by the registration roller pair 15 to be nipped while being conveyed. As a result, at the second transfer nip portion 17, the toner image in which toner images of four colors are superimposed is secondarily transferred onto the sheet S in a batch so that an unfixed toner image is formed on the sheet S.

The sheet S output from the secondary transfer nip portion 17 is introduced into the fixing device 19 where it is subjected to fixing process for toner image with heat and pressure. The sheet S output from the fixing device 19 is discharged onto the inside space formed over the inside lower cover 30 disposed above the toner bottle unit 22 as image formed matter by the discharge roller pair 20. This means that the sheet discharging position is located in the inside space.

The discharge roller pair 20 is a discharge portion provided on the apparatus main body 100 that discharges the sheet S output from the apparatus main body 100 in the conveying direction (leftward direction in the first directions). The inside lower cover 30 has an installation surface where the processing unit is to be installed. The inside space is formed in the apparatus main body 100 by the installation surface of the inside lower cover 30 and the surface on which the discharge portion with discharge roller pair 20 is provided. The connector installation surface on which the main body connection portion 40 is disposed defines the inside space in the directions (second directions) crossing the conveying direction of the sheet S. The inside space has an opening portion that is open to the outside of the apparatus. The opening portion is at least open toward the front side of the image forming apparatus in the directions (second directions) crossing the conveying direction of the sheet S. The opening portion may be open to other directions (for example, the downstream side in the sheet conveying direction). When the processing unit is attached to the apparatus main body 100, the processing unit is inserted into the inside space from the opening portion. The inside lower cover 30 may serve as a receiving portion that receives the sheet discharged by the discharge roller pair 20.

(Processing Unit)

Next, a processing unit will be described which can be attached to the image forming apparatus. The image forming apparatus 1 has the processing unit that is detachably attachable to the apparatus main body 100.

The processing unit is inserted into the inside space of the apparatus main body 100 from the above described opening portion and is installed on the installation surface of the inside lower cover 30. The processing unit receives the sheet S discharged by the discharge roller pair 20 and performs a process.

Generally, sheets or bundles of sheets after the image formation may be stitched by staples for every bundle, perforated by a punch, or folded in three or in the middle. Users who use a large amount of sheets tend to perform such processes.

Therefore, in order to provide high convenience to users by improving working efficiency of these processes, it is preferable for the image forming apparatus to be provided with a processing unit that can perform these processes automatically after the sheets are discharged.

Processing units which are attached to the apparatus main body 100 of the image forming apparatus 1 that has the above described inside space are broadly classified as two kinds of inner fisher to be attached in the inside space of the apparatus main body 100 and saddle finisher to be attached to a side surface of the apparatus main body 100.

The inner finisher can be installed in the inside space of the image forming apparatus and is capable of performing processes for the sheet while keeping the installation area of the entire apparatus minimum.

The saddle finisher is disposed on a side surface of the image forming apparatus, so that a predetermined area for installation is necessary. On the other hand, a larger size is possible by the saddle finisher and more functions can be implemented than that of the inner finisher.

The above described processing units are often optional apparatuses that are selected and attached according to the user's demands. When a processing unit is not attached to the image forming apparatus, a sheet receiving tray is installed on the installation surface of the inside lower cover 30 or the sheet S is directly discharged on the installation surface of the inside lower cover 30. Therefore, although a processing unit is not attached, an image forming apparatus with the configuration in which a processing unit is attachable is the one that can be included in the present embodiment.

Figure 2:
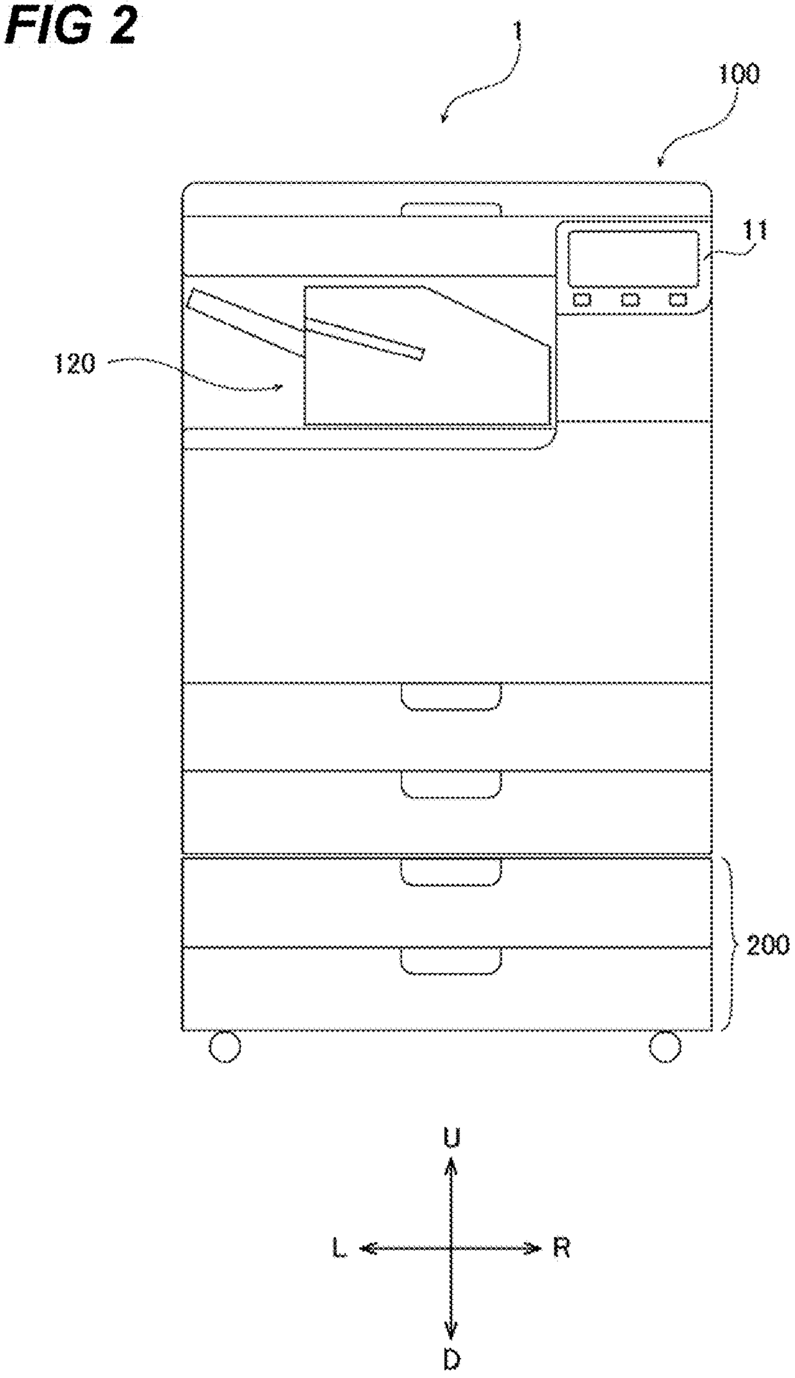
FIG. 2 is a diagram showing a front view of the image forming apparatus and a processing unit.
Figure 3:
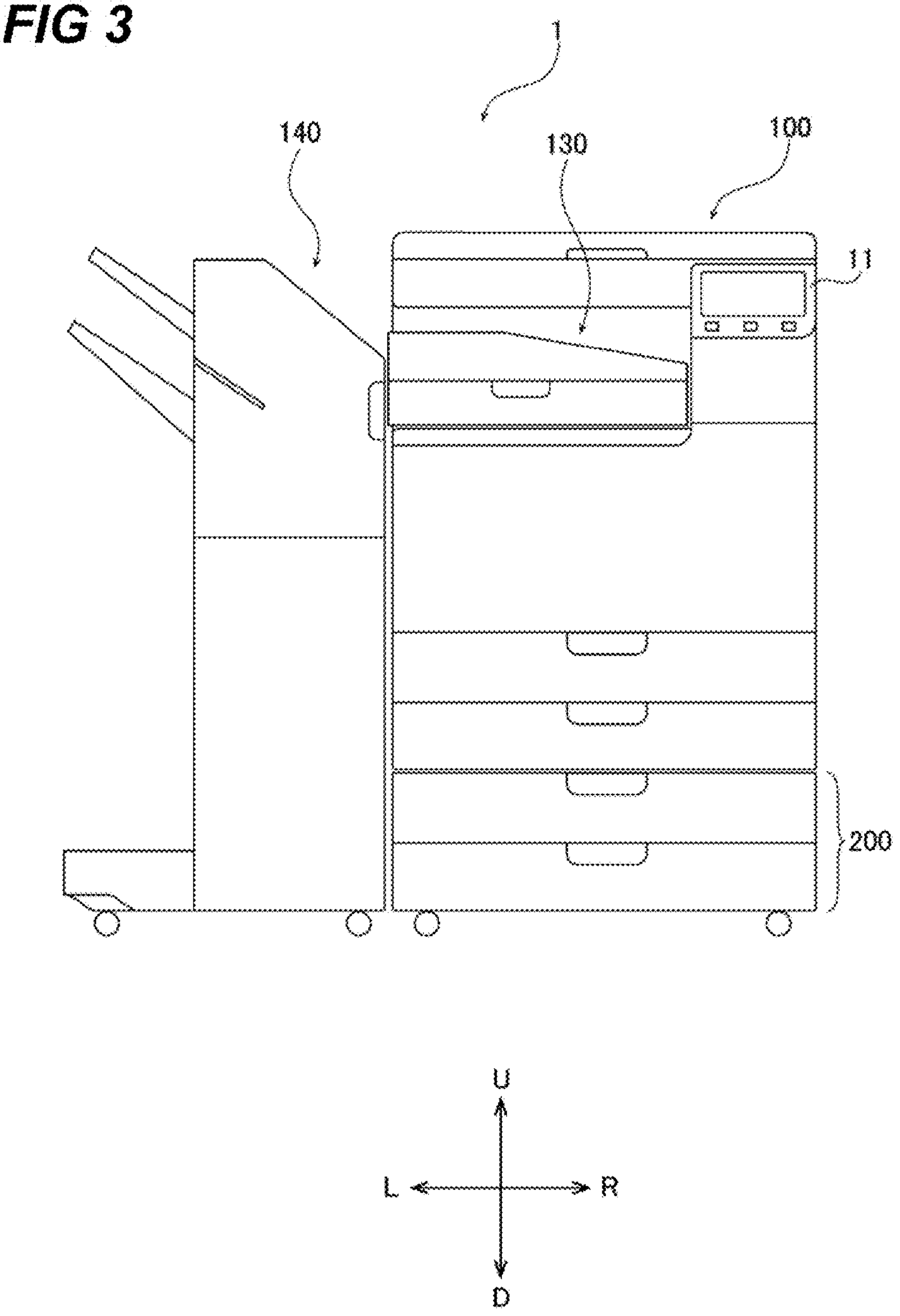
FIG. 3 is a diagram showing a front view of the image forming apparatus and the processing unit.

FIG. 2 is a diagram showing an example of the image forming apparatus 1 with the inner finisher 120 installed on the inside space on the inside lower cover 30. FIG. 3 is a diagram showing an example of the image forming apparatus 1 with the saddle finisher 140 installed on the side surface.

As shown in FIG. 2, the cassette pedestal 200 that is an optional unit for increasing sheet feeding ports is connected to the bottom surface of the image forming apparatus 1. Further, the inner finisher 120 is connected in the inside space on the inside lower cover 30.

As understood from FIG. 2, despite of the additional installation of the inner finisher 120, the installation area necessary for image forming apparatus 1 does not increase, so that processing functions can be added with space saving.

As shown in FIG. 3, the cassette pedestal 200 is connected to the bottom surface of the image forming apparatus 1 and the saddle finisher 140 is disposed on the left side surface of the image forming apparatus 1. Because of this, the distance between the discharge roller pair 20 that discharges the sheet and the saddle finisher 140 becomes longer by the width of the inside space. To deal with this, the buffer path unit 130 as a conveying unit that relays and coveys the sheet from the discharge roller pair 20 to the saddle finisher 140 that is another unit, is disposed in the inside space.

As described above, the buffer path unit 130 is one of the processing units, like the inner finisher 120.

(Configuration for Connecting Processing Unit)

By the way, in the processing unit such as the inner finisher 120 and the buffer path unit 130, sheet conveyance and various processes are controlled by control signals from the image forming apparatus side. Therefore, in a processing unit, an electrical connection portion is necessary for transmitting control signals from the apparatus main body of the image forming apparatus.

In many processing units to be connected to an image forming apparatus, a cable with a connector on the tip of the cable is disposed at a position where a user can access and visibly recognize the cable easily. The processing unit is electrically connected to the apparatus main body by performing the two steps of: securing the processing unit to the image forming apparatus, and manually connecting a connector on the processing unit side to a connector on the image forming apparatus side.

In contrast, in the present embodiment, the electrical connection for transmitting control signals from the apparatus main body is performed by a drawer connector (not shown in FIG. 2) in order to simplify the installation procedure of the processing unit and to shorten the installation time.

Figure 4:
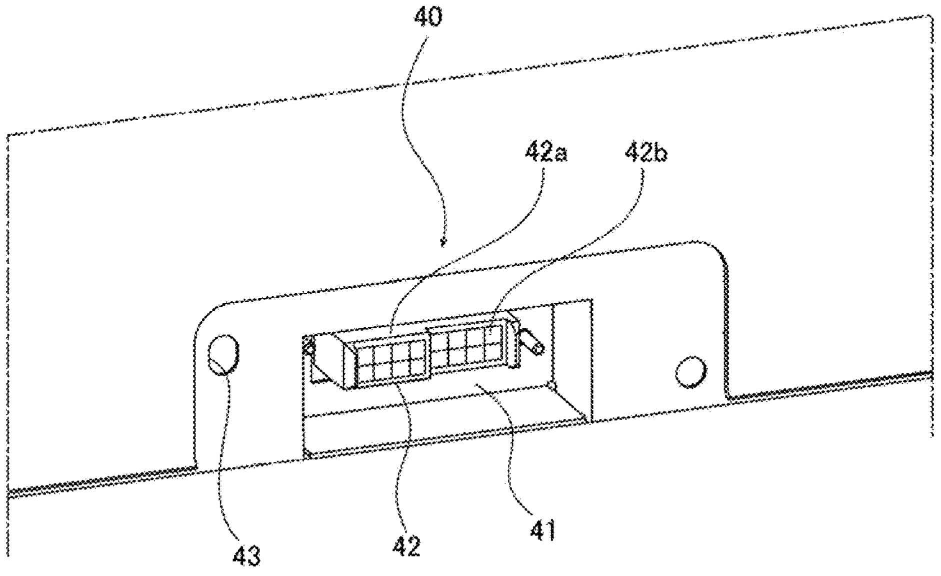
FIG. 4 is a diagram showing a partially enlarged perspective view of the image forming apparatus.
Figure 5A:
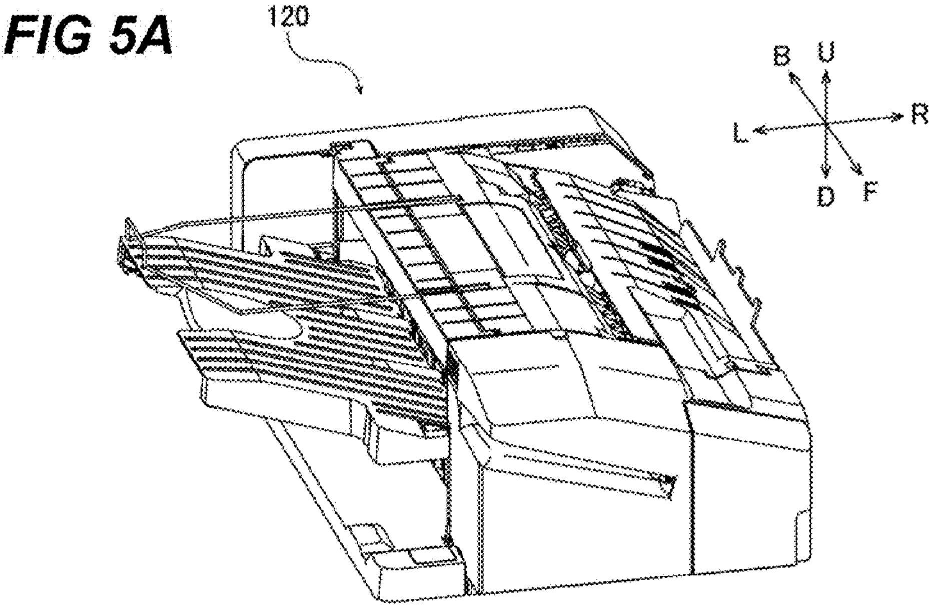
FIGS. 5A and 5B are diagrams showing a perspective view of the processing unit.
Figure 5B:
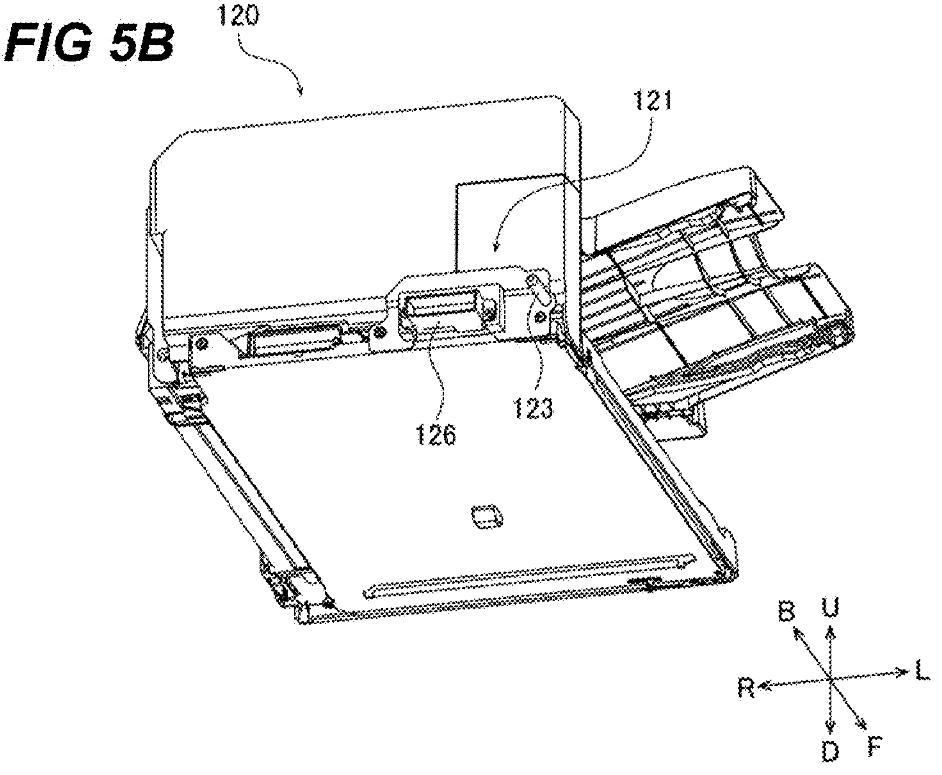
Figure 6:
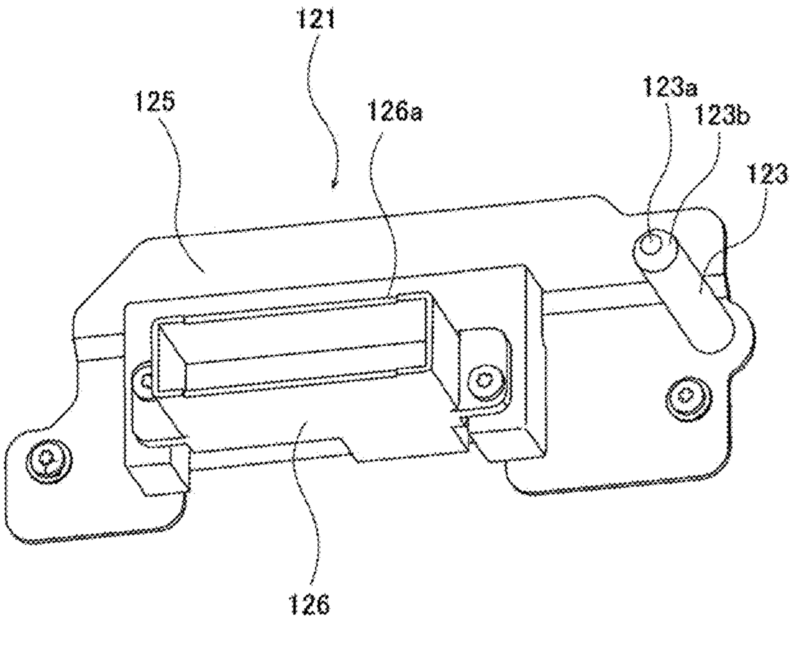
FIG. 6 is a diagram showing a partially enlarged perspective view of the processing unit.

Next, the disposition of the drawer connector will be described referring to FIGS. 1, 4, 5 and 6. FIG. 4 is a diagram showing an enlarged perspective view of the main body connection portion 40 on the image forming apparatus side. FIGS. 5A and 5B are diagrams showing a perspective view of the inner finisher 120 alone. FIG. 5A is a diagram showing a perspective view of the inner finisher 120 viewed from above on the front side. FIG. 5B is a diagram showing a perspective view of the inner finisher 120 viewed from below on the back side. FIG. 6 is a diagram showing an enlarged perspective view of the unit connection portion 121 of the inner finisher 120.

The drawer connector consists of a pair of a male connector and a female connector. Namely, the drawer connector consists of the drawer connector 126 (first connector) of the unit connection portion 121 on the inner finisher 120 side and the drawer connector 42 (second connector) of the main body connection portion 40 on the image forming apparatus 1 side.

Figure 7:
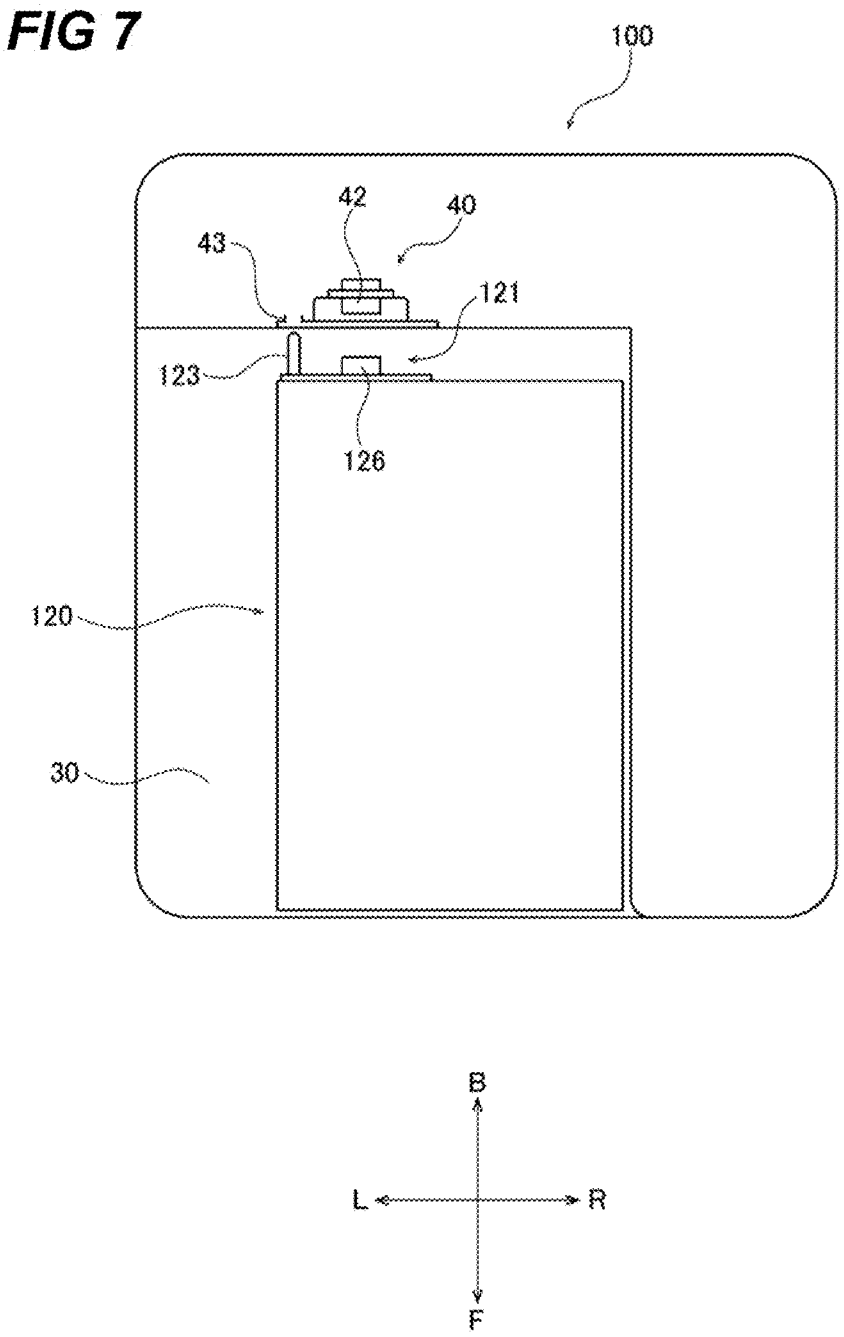
FIG. 7 is a diagram showing a cross-sectional view of the image forming apparatus and the processing unit.

As shown in FIGS. 1 and 4, the main body connection portion 40 on the image forming apparatus 1 side is located on the substantially central portion on the connector installation surface on the back side in the forward/backward directions in the inside space. As shown in FIG. 7, the main body connection portion 40 is disposed further back in the forward/backward directions (second directions) with respect to the inside lower cover 30. In another point of view, the main body connection portion 40 is disposed at one side (first side) in the directions (second directions) crossing the sheet discharge direction with respect to the position (sheet discharge position) of the sheet discharged from the discharge portion (discharge roller pair 20). The drawer connector 42 (second connector, main body side connector) on the image forming apparatus 1 side is disposed on a substantially central portion of the drawer holding plate 41 (of the main body connection portion 40) that forms a surface on back side in forward/backward directions in the inside space.

As shown in FIG. 5B, the unit connection portion 121 on the inner finisher 120 side is provided on the tip side with respect to the insertion into the backward direction B in the forward/backward directions. The drawer connector 126 (first connector, processing unit side connector) on the inner finisher 120 side is disposed at the center of the unit drawer holding plate 125 in the unit connection portion 121. When the inner finisher 120 is installed, the drawer connector 126 on the inner finisher 120 side is inserted into the drawer connector 42 on the image forming apparatus 1 side along the direction (second direction) crossing the sheet discharging direction. In this way, the drawer connector 126 on the inner finisher 120 side and the drawer connector 42 on the image forming apparatus 1 side are engaged with each other, so that the inner finisher 120 and the apparatus main body 100 are electrically connected to each other.

The drawer connector 42 on the apparatus main body 100 side is provided with the square-tube-shaped housing 42*a*. Inside the square-tube-shaped housing 42*a*, the terminal group 42*b* having multiple terminals for electrically connecting the inner finisher 120 is disposed. Namely, the drawer connector 42 includes the terminal group 42*b* and the housing 42*a* that encloses the terminal group 42*b*.

Similarly, the drawer connector 126 on the processing unit side is provided with the square-tube-shaped housing 126*a* and inside the square-tube-shaped housing 126*a*, the terminal group (not shown) for electrically connecting the apparatus main body 100 is disposed.

With the above described configuration, when the inner finisher 120 is attached in the inside space of the image forming apparatus 1, the drawer connector 126 is located at the tip side in the unit inserting direction, so that the drawer connector 126 is easily fit into the drawer connector 42 on the main body side only by the procedures of the unit attaching operation, which enables easy electrical connection.

In the above, although the connection of the drawer connector on the processing unit side has been described exemplifying the case where the processing unit is the inner finisher 120, similar is the case where the processing unit is the buffer path unit 130. Namely, the configuration and the arrangement of the unit connection portion of the buffer path unit 130 are equivalent to those of the inner finisher 120. The unit connection portion 121 can be commonly used in the buffer path unit 130 and the inner finisher 120.

(Positioning Configuration of Processing Unit/Left and Right Directions)

Next, the positioning configuration of the processing unit with respect to the image forming apparatus 1 in the left and right directions will be described.

As shown in FIGS. 5B and 6, the inner finisher 120 is provided with the positioning shaft 123 that is positioned by being engaged with the apparatus main body 100 of the image forming apparatus 1. The positioning shaft 123 is disposed at a tip portion in the insertion of the inner finisher 120 in the backward direction B in the forward and backward directions. The positioning shaft 123 is disposed in the vicinity of the drawer connector 126 in the unit connection portion 121. The positioning shaft 123 is a first guide pin that extends in the forward and backward directions.

As shown in FIG. 4, the apparatus main body 100 of the image forming apparatus 1 is provided with the positioning hole 43 that engages with the positioning shaft 123. The positioning hole 43 is disposed, in the apparatus main body 100, on the backside surface of the inside space in the forward and backward directions. The positioning hole 43 is disposed further back in the forward and backward directions than the inside lower cover 30. The positioning hole 43 is a first guide hole through which the positioning shaft 123 passes.

The positioning shaft 123 of the unit connection portion 121 is disposed such that the positioning shaft 123 fits into the positioning hole 43 of the main body connection portion 40. As shown in FIG. 6, the positioning shaft 123 is a cylindrical shaft member that extends in the forward and backward directions. The length of the positioning shaft 123 in the forward and backward directions is adjusted such that the positioning shaft 123 engages with the positioning hole 43 before the drawer connector 126 on the inner finisher 120 side engages with the drawer connector 42 on the apparatus main body 100 side. In the forward and backward directions, the positioning shaft 123 extends further back than the drawer connector 126. When the inner finisher 120 is installed, the inner finisher 120 is first in the state (1) in which the positioning shaft 123 is separated from the positioning hole 43 and the drawer connector 126 on the inner finisher 120 side is separated from the drawer connector 42 on the apparatus main body 100 side. As the inner finisher 120 relatively moves with respect to the apparatus main body 100, the inner finisher 120 shifts from the state (1) to the state (2) in which the positioning shaft 123 passes through the positioning hole 43 and the drawer connector 126 on the inner finisher 120 side is separated from the drawer connector 42 on the apparatus main body 100. Thereafter, the inner finisher 120 shifts from the state (2) to the state (3) in which the positioning shaft 123 passes through the positioning hole 43 and the drawer connector 126 on the inner finisher 120 side is connected to the drawer connector 42 on the apparatus main body 100.

In this way, the positioning shaft 123 on the processing unit side fits into the positioning hole 43 on the apparatus main body side first, so that the drawer connector 126 on the processing unit side and the drawer connector 42 on the machine body side are positioned opposed to each other, and the connector pairs are fit without riding over.

The fitting of the positioning shaft 123 on the processing unit side into the positioning hole 43 on the apparatus main body side, and the fitting of the drawer connector 126 into the drawer connector 42 on the apparatus main body side will be described using FIGS. 7, 8 and 9, which are diagrams showing A-A cross-sectional view in FIG. 1 of the image forming apparatus and the processing unit.

FIG. 7 shows the state immediately before the positioning shaft 123 of the inner finisher 120 fits into the positioning hole 43 on the apparatus main body side. FIG. 8 shows the state in which the drawer connector 126 on the processing unit side fits into the drawer connector 42 on the apparatus main body side after the positioning shaft 123 of the inner finisher 120 fits into the positioning hole 43 on the apparatus main body side.

Figure 8:
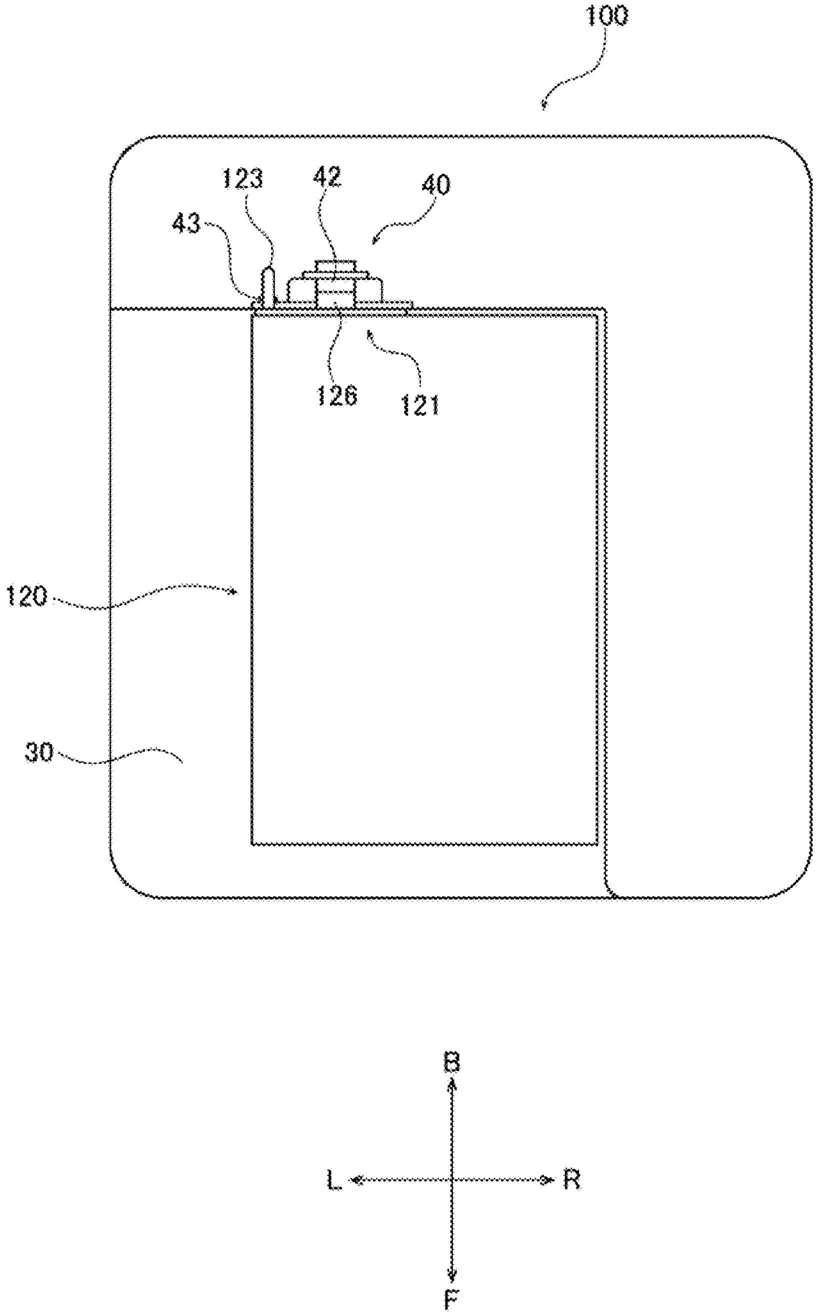
FIG. 8 is a diagram showing a cross-sectional view of the image forming apparatus and the processing unit.

It is understood from FIGS. 7 and 8 that the fitting of the positioning shaft 123 on the processing unit side into the positioning hole 43 on the apparatus main body side is performed before the fitting of the drawer connector pair (42, 126) begins.

The above configuration reduces the risk that the connection of the connectors is not properly performed by the drawer connector pair (42, 126) riding over without fitting when the processing unit is installed.

Next, the configuration will be described that makes easier the connection of the connectors by being combined with the configuration of fitting the positioning shaft 123 into the positioning hole 43.

Figure 9:
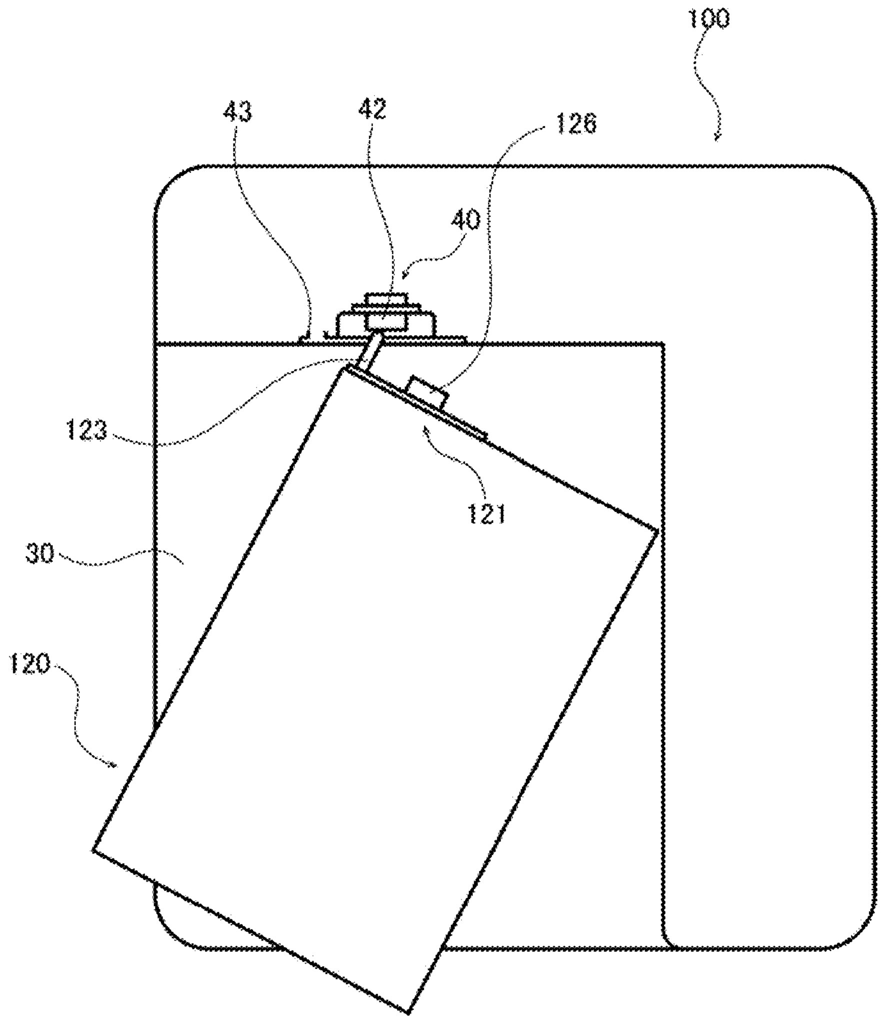
FIG. 9 is a diagram showing a cross-sectional view of the image forming apparatus and the processing unit.

As shown in FIG. 9, the inner finisher 120 might be inserted into the inside space of the apparatus main body 100 in the state where the left tip portion on which the unit connection portion 121 is disposed precedes the right tip portion (tilted in the leftward direction). In this case, the positioning shaft 123 on the processing unit side might hit the drawer connector 42 on the apparatus main body side.

This state can occur when it is attempted that the processing unit is inserted into the apparatus main body in order to make the connector on the processing unit side while being swung in the leftward and rightward directions in the state where the connector on apparatus main body side is not visible. In this case, as shown in FIG. 9, the positioning shaft 123 on the processing unit side might hit the drawer connector 42 on the apparatus main body side. Therefore, depending on the momentum of its installation, the drawer connector 42 may be dented or cracked. Fitting of the connectors in that state could result in a poor connection.

(Arrangement of Positioning Shaft and Connector)

Figure 11:
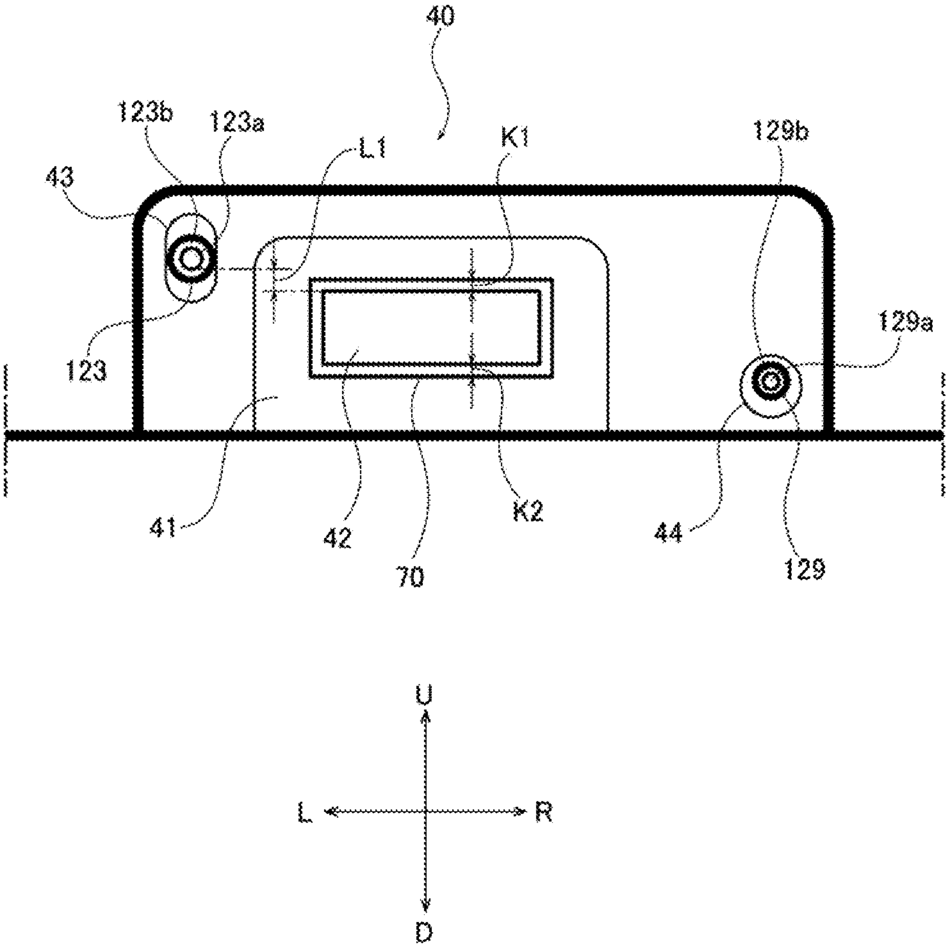
FIG. 11 is a diagram showing a partially enlarged perspective view of the image forming apparatus.
Figure 12:
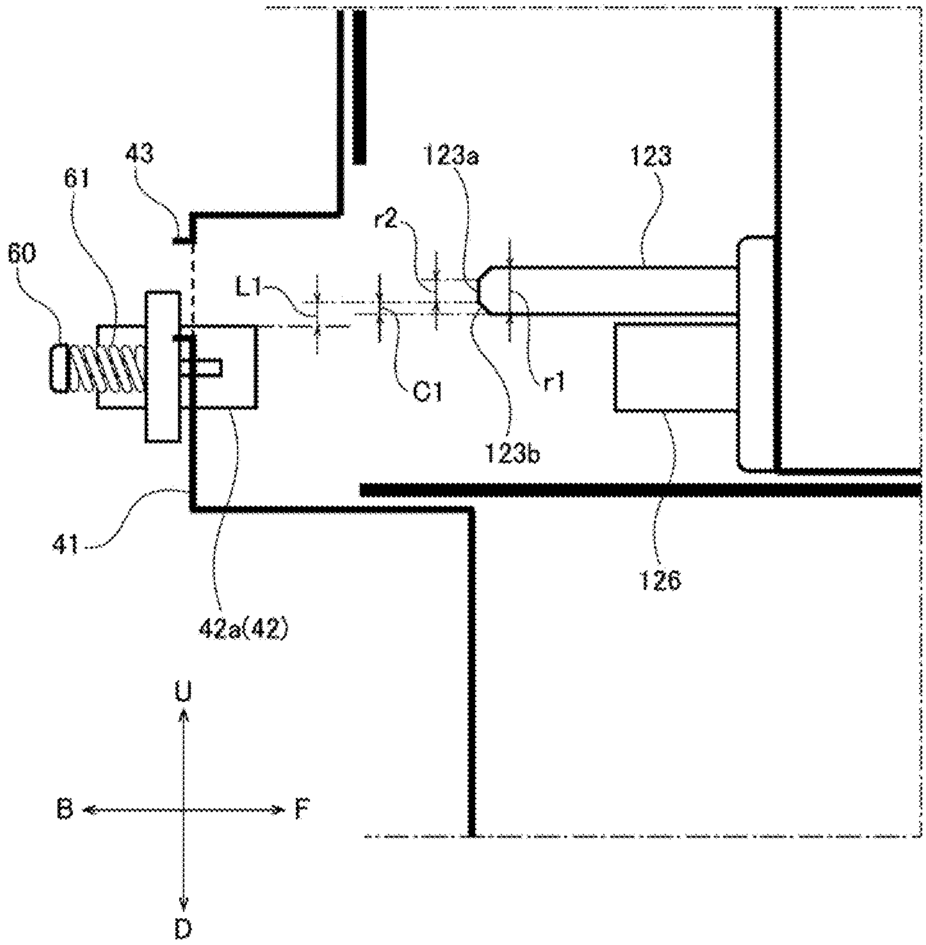
FIG. 12 is a diagram showing an enlarged cross-sectional view of the connector portion of the image forming apparatus and the processing unit.

In the present embodiment, at least one portion of the positioning shaft 123 on the inner finisher 120 side is disposed at a different position from that of the drawer connector 42 in the upward and downward directions crossing the rightward and leftward directions and the forward and backward directions in the state where the bottom surface of the inner finisher 120 is in contact with the installation surface. As shown in FIGS. 11 and 12, the center position of the positioning shaft 123 in the upward and downward directions is different from the center position of the housing 42*a* of the drawer connector 42 of the apparatus main body 100 in the upward and downward directions. It is preferable that the center position of the positioning shaft 123 does not overlap with the housing 42*a* in the upward and downward directions.

The positioning shaft 123 is a cylindrical shaft member that extends in the forward and backward directions. The positioning shaft 123 is provided with the circular plane portion 123*a* at the tip in the inserting direction, which has the diameter r2 less than the outer diameter r1 of the positioning shaft 123. Specifically, the diameter r2 of the plane portion 123*a* is equal to or less than half the outer diameter r1 of the positioning shaft 123. Further, the positioning shaft 123 is provided with the tapered portion 123*b* whose outer diameter becomes less toward the plane portion 123*a* in a position closer to the tip of the inserting direction (see region C1 in FIG. 12).

Namely, the ridge line on the tip of the positioning shaft 123 in the inserting direction (backward direction of forward and backward directions) is chamfered to be slanted. In FIG. 11, the positioning shaft 123 is depicted as the coaxial double lines in which the outer diameter r1 of the shaft is shown as a thick line and the plane portion 123*a* at the tip excluding chamfered portion is shown as a thin line.

In the present embodiment, the entirety of the plane portion 123*a* on the tip is disposed at the position different from that of the drawer connector 42 in the upward and downward directions. As shown in FIG. 12, the plane portion 123*a* of the positioning shaft 123 is disposed above the upper end of the housing 42*a* of the drawer connector 42 in the upward and downward directions (vertical directions).

In the present embodiment, the drawer connector 42 is supported such that the drawer connector 42 can be displaced in the upward and downward directions (directions indicated by arrows U and D in FIG. 11) with respect to the apparatus main body 100. Therefore, in response to becoming in contact with the positioning shaft 123, the drawer connector 42 can be displaced in the upward and the downward directions by being pushed by the positioning shaft 123.

The supporting configuration of the drawer connector 42 disposed on the main body connection portion 40 will be described using FIGS. 14A and 14B.

The image forming apparatus 1 is provided with the pressing spring 61 as an urging member that urges the drawer connector 42 toward the direction in which the drawer connector 42 engages with the drawer connector 126. The drawer connector 42 is urged in the forward direction of the apparatus main body 100 by the pressing spring 61 secured on the drawer holding plate 41 by the stepped screw 60. The pressing spring 61 is disposed in two positions such that the rib extending the rightward and leftward directions and the pressing spring 61 engage with each other. Namely, both ends of the drawer connector 42 in the right and left directions are urged by the pressing spring 61.

Figure 14A:
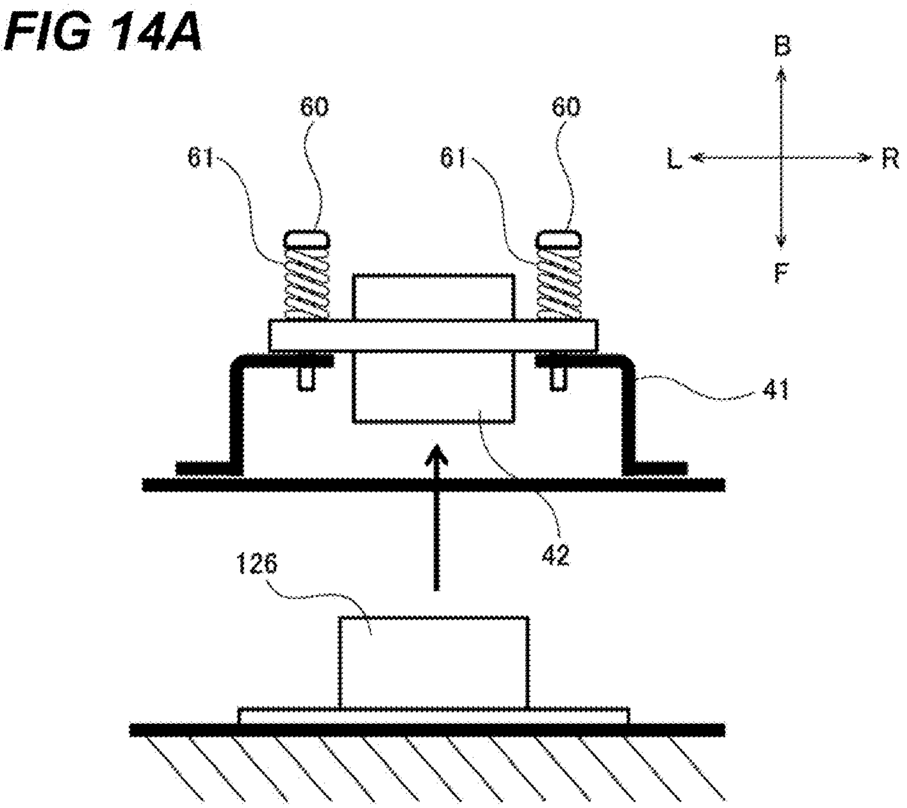
FIGS. 14A and 14B are diagrams showing an enlarged cross-sectional view of the connector portion of the image forming apparatus and the processing unit.
Figure 14B:
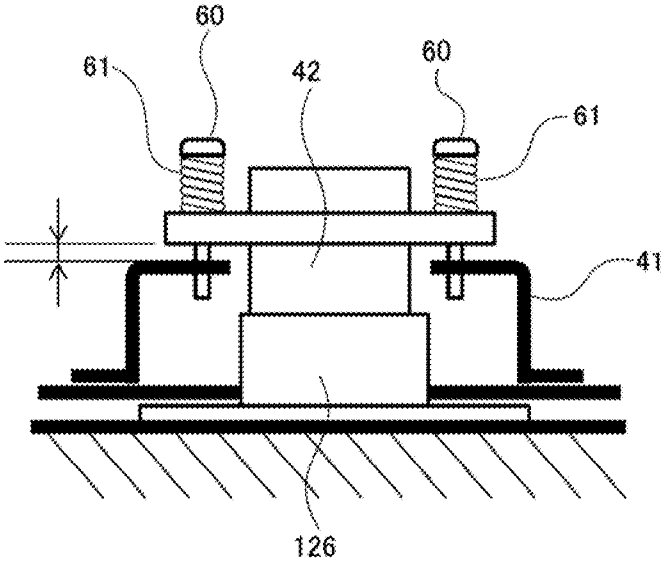

As understood from FIG. 14B, the drawer connector 42 is retractable with respect to the drawer holding plate 41 in the backward direction within the range t in which the pressing spring 61 can be compressed. As a result, even if the size of the inner finisher 120 in the backward direction has variations, these variations can be absorbed by the range t in which the drawer connector 42 is retractable, so that the inner finisher 120 can be pushed in the image forming apparatus 1 and the fitting between the connector pair can be strengthened.

As shown in FIG. 11, the drawer connector 42 on the apparatus main body side is disposed inside the opening 70 with predetermined clearances to the drawer holding plate 41 (edge of the opening 70). There are predetermined clearances (first distances) between the drawer connector 42 and the drawer holding plate 41 (edge of the opening 70) in the upward and downward directions (vertical directions) and the rightward and leftward directions. In FIG. 11, only the clearances K1 and K2 in the upward and downward directions, which are necessary for description, are indicated.

The drawer connector 42 is held in a floating state by the pressing spring 61 shown in FIGS. 14A and 14B. As a result, the drawer connector 42 can be moved in the opening 70 of the drawer holding plate 41 in the upward and downward directions for the clearances (K1, K2).

The positioning shaft 123 is shifted in the upward direction with respect to the drawer connector 42 such that the plane portion 123*a* at the tip of the shaft does not overlap with the drawer connector 42 in the upward and the downward directions.

Figure 10:
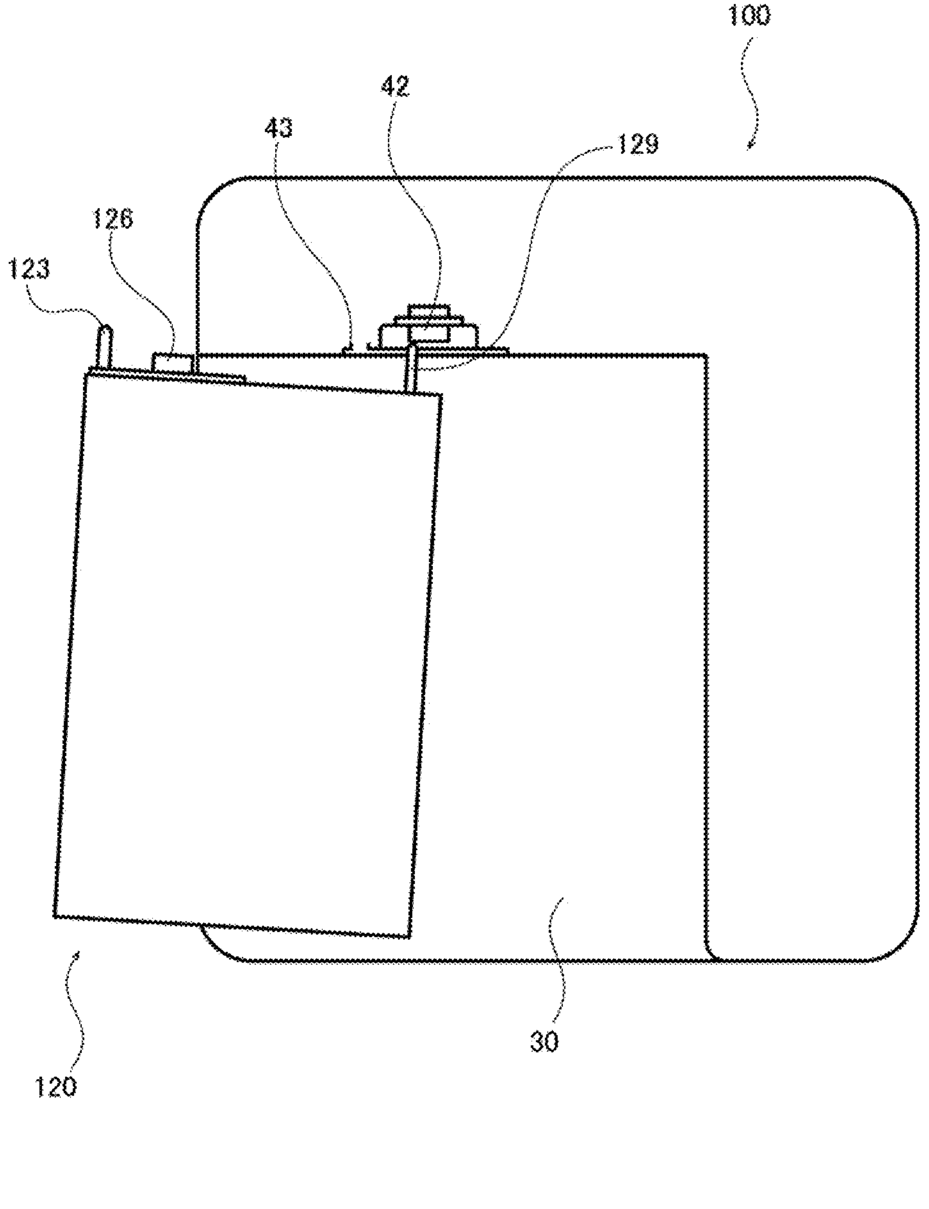
FIG. 10 is a diagram showing a cross-sectional view of the image forming apparatus and the processing unit.

Therefore, even if the unit is moved such that the positioning shaft 123 on the inner finisher 120 side overlaps with the drawer connector 42 on the apparatus main body 100 side in the rightward and leftward directions as shown in FIGS. 9 and 10, the positioning shaft 123 escapes above or under the drawer connector 42. Therefore, the possibility of producing a dent or crack on the connector can be reduced. Further, the possibility of the positioning shaft 123 being in contact with the connection terminals of the drawer connector 42 can be reduced so that the connection terminals, which are relatively weak in strength can be easily protected. Therefore, a worker is not required to be overly cautious about these risks. As a result, the operations for installing the inner finisher 120 on the apparatus main body 100, especially the operations for fitting the drawer connector 126 on the inner finisher 120 side to the drawer connector 42 on the apparatus main body 100 side can be made easy.

As shown in FIG. 11, the distance L1 (second distance) exists between the plane portion 123*a* of the tip of the positioning shaft 123 excluding the chamfered portion and the housing 42*a* of the drawer connector 42. The drawer connector 42 can be moved in the upward and downward directions for the clearances K1 and K2, respectively. The positioning shaft 123 and the drawer connector 42 are configured such that the second distance L1 is greater than the clearance K1 (first distance).

With this configuration, even if the drawer connector 42 shifts in the upward direction for the clearance K1, the plane portion 123*a* of the tip of the positioning shaft 123 does not touch the drawer connector 42 when attaching the unit. In this case, the tapered portion 123*b* as a chamfered portion of the tip of the positioning shaft 123 can touch the drawer connector 42. However, the positioning shaft 123 does not abut against the drawer connector 42 head on because the drawer connector 42 escapes in the downward direction by the tapered portion 123*b* of the chamfered portion. Therefore, a much load is not applied to the connector when attaching the unit.

Therefore, when the tapered portion 123*b* of the positioning shaft 123 abuts against the housing 42*a* of the drawer connector 42, the drawer connector 42 escapes downwardly along the tapered portion 123*b* of the positioning shaft 123.

For example, the drawer connector 42 held in a floating state by being urged by the pressing spring 61 shifts upwardly for the clearance K1, the drawer connector 42 is diverted downwardly by the tapered portion 123*b* provided at the tip of the positioning shaft 123. As a result, the plane portion 123*a* on the tip of the positioning shaft 123 does not abut the drawer connector 42 head on so that the risk of suffering from a dent or a crack can be reduced.

In the above, the floating configuration of the connector using a pressing spring has been exemplified but the configuration of the connector is not limited to this configuration. Other configurations of the connector is possible as long as the connector on the apparatus main body side is supported such that the connector is movable in the upward and downward directions.

In the above, as the configuration in which at least one portion of the positioning shaft 123 is disposed in a position that is different from that of drawer connector 42, the configuration has been exemplified in which the positioning shaft 123 is disposed on the left side of the connector and the entirety of the plane portion 123*a* of the positioning shaft 123 is disposed above the upper end of the housing 42*a* on the drawer connector 42 in the upward and downward directions. However, the configuration in which at least one portion of the positioning shaft 123 is disposed in a position that is different from that of drawer connector 42 is not limited to the above configuration. The entirety of the plane portion 123*a* of the positioning shaft 123 may be disposed below the lower end of the housing 42*a* of the drawer connector 42 in the upward and downward directions. Further, the positioning shaft 123 may be disposed on the right side of the connector. It may be possible that the tapered portion 123*b* is not provided at the tip of the positioning shaft 123. Namely, it may be possible that the diameter r2 of the plane portion 123*a* at the tip of the positioning shaft 123 is the same as the outer diameter r1 of the positioning shaft 123. In this case, it is preferable that the housing 42*a* of the drawer connector 42 has a tapered shape.

In the above, the configuration is exemplified in which one positioning shaft 123 is provided on the processing unit side. However, it is possible that multiple positioning shafts are provided on the processing unit side. In the following, the two positioning shafts 123 and 129 are exemplified as the multiple positioning shafts. In this case, it is preferred that each positioning shaft has a different objective such as one positioning shaft 123 is for positioning and the other positioning shaft 129 is for rough guiding.

Next, the configuration in which the inner finisher 120 has two positioning shafts 123 and 129 will be described.

The inner finisher 120 shown in FIGS. 6 to 8 has the configuration in which the positioning shaft 123 is disposed on the left side of the drawer connector 126 and near the left side surface of the inner finisher 120. However, the configuration is not limited to this. For example, as shown in FIG. 10, the positioning shaft 129 can be further provided in a position near the right side surface of the inner finisher 120, which is different from the position of the positioning shaft 123. In the inner finisher 120, the positioning shaft 129 is disposed at the tip in an inserting operation in the backward direction out of the forward and backward directions. The positioning shaft 129 extends in the forward and backward directions.

In FIG. 10, the one positioning shaft 123 is for positioning the processing unit in the rightward and leftward directions similar to the configuration shown in FIGS. 7 and 8. The other positioning shaft 129 is for roughly guiding the processing unit and for preventing the right side surface of the processing unit from floating.

FIG. 10 shows the state where it is attempted that the inner finisher 120 is attached to the apparatus main body 100 with the inner finisher 120 shifted leftward while the positioning shaft 129 is disposed near the right side surface of the inner finisher 120. In this case, it is possible that the positioning shaft 129 on the tip side of the inner finisher 120 may hit the drawer connector 42 on the apparatus main body side, similar to the positioning shaft 123 on the tip side of inner finisher 120 shown in FIG. 9.

In FIG. 10, the inner finisher 120 is not so tilted as compared with the case shown in FIG. 9, the operation for fitting the connector on the processing unit side to the connector on the apparatus main body side in FIG. 10 can be more properly done as compared with the case shown in FIG. 9. However, it is understood that depending on the disposition of the positioning shafts and attaching operation of the processing unit, there are some risks of connection failures of connector pair.

Therefore, not only one portion of the positioning shaft 123 as a first guide pin, but also one portion of the positioning shaft 129 as a second guide pin is disposed in a position different from that of the housing 42*a* of the drawer connector 42 in the upward and downward directions.

More specifically, the positioning shaft 123 is the first guide pin that extends in the forward and backward directions and that is disposed at the tip side in the insertion of the inner finisher 120, and the positioning shaft 129 is the second guide pin that extends in the forward and backward directions and that is disposed at a position different from that of the positioning shaft 123.

Further, the apparatus main body 100 includes the positioning holes 43 and 44 through which the positioning shafts 123 and 129 pass respectively. The positioning hole 43 is disposed at the back side of the inside lower cover 30 of the apparatus main body 100 in the forward and backward directions and is a first guide hole through which the positioning shaft 123 passes. The positioning hole 44 is disposed at the back side of the inside lower cover 30 of the apparatus main body 100 in the forward and backward directions and is a second guide hole through which the positioning shaft 129 passes. The positioning hole 43 is disposed at the left side of the drawer connector 42 whereas the positioning hole 44 is disposed at the right side of the drawer connector 42.

The configuration of the positioning shaft 123 has already been described and the positioning shaft 129 is configured similar to that of the positioning shaft 123.

The positioning shaft 129 is a cylindrical shaft member that extends in the forward and backward directions. The positioning shaft 129 is provided with the circular plane portion 129*a* at the tip in the inserting direction, which has the diameter r4 less than the outer diameter r3 of the positioning shaft 129. Specifically, the diameter r4 of the plane portion 129*a* is equal to or less than half the outer diameter r3 of the positioning shaft 129. Further, the positioning shaft 129 is provided with the tapered portion 129*b* whose outer diameter becomes less toward the plane portion 129*a* in a position closer to the tip of the inserting direction (see region C2 in FIG. 13).

Similar to the positioning shaft 123, the ridge line on the tip of the positioning shaft 129 in the inserting direction (backward direction of forward and backward directions) is chamfered to be slanted. In FIG. 11, the positioning shaft 129 is depicted as the coaxial double lines in which the outer diameter r3 of the shaft is shown as a thick line and the plane portion 129*a* at the tip excluding the chamfered portion is shown as a thin line.

Figure 13:
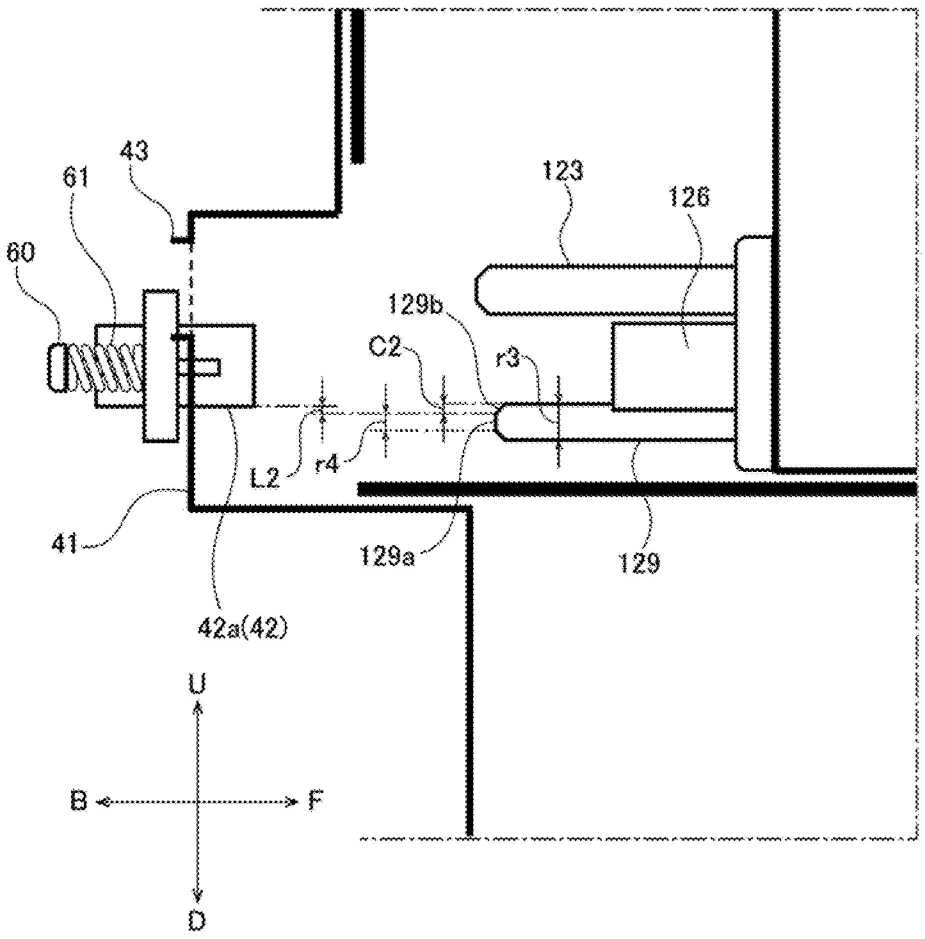
FIG. 13 is a diagram showing an enlarged cross-sectional view of the connector portion of the image forming apparatus and the processing unit.

As shown in FIGS. 11 and 13, the plane portion 123*a*, which is one portion of the positioning shaft 123, is disposed above the upper end of the drawer connector 42 in the upward and downward directions, whereas the plane portion 129*a*, which is one portion of the positioning shaft 129, is disposed below the lower end of the drawer connector 42 in the upward and downward directions.

As described above, the drawer connector 42 is supported such that the drawer connector 42 can be displaced in the upward and downward directions with respect to the apparatus main body 100. Therefore, in response to becoming in contact with the positioning shaft 123, the drawer connector 42 can be displaced in the upward and the downward directions.

As described above, the drawer connector 42 is disposed in side the opening 70 with predetermined clearances to the drawer holding plate 41 (edge of the opening 70) in the upward and downward directions, and the rightward and leftward directions. In FIG. 11, only the clearances K1 and K2 in the upward and downward directions, which are necessary for description, are indicated.

The positioning shaft 129 is shifted in the downward direction with respect to the drawer connector 42 such that the height of the positioning shaft 129 is different from that of the positioning shaft 123. As a result, the plane portion 129*a* at the tip of the shaft does not overlap with the drawer connector 42 in the upward and the downward directions.

This configuration is adopted to eliminate the concerns in which when multiple positioning shafts are disposed at the same height in the upward and downward directions, one positioning shaft (positioning shaft 129) might be inserted into the positioning hole 43 for another positioning shaft (positioning shaft 123) by mistake. Namely, when multiple positioning shafts 123 and 129 are provided, it is preferable that the heights of these positioning shafts in the upward and downward directions (vertical directions) should be different from each other.

Analogous to the positioning shaft 123, the distance L2 (second distance) exists between the plane portion 129*a* and the housing 42*a* of the drawer connector 42. The drawer connector 42 can be moved for the clearances K1 and K2, respectively. The positioning shaft 129 and the drawer connector 42 are configured such that the second distance L2 is greater than the clearance K2 (first distance).

With this configuration, even if the drawer connector 42 shifts in the downward direction for the clearance K2, the plane portion 129*a* of the tip of the positioning shaft 129 does not touch the drawer connector 42 and the drawer connector 42 is diverted in the upward direction by the tapered portion 129*b* when attaching the unit. Accordingly, a dent or a crack is not produced on the connector.

In the above, although the case is exemplified where the processing unit is the inner finisher 120, similar is the case where the processing unit is the buffer path unit 130. Namely, the positional relationship between the drawer connector 42 on the apparatus main body side and the positioning shafts 123 and 129 is the same even when the processing unit is the buffer path unit 130.

With the configuration as described above, the load and the damage to the drawer connector 42 on the apparatus main body side suffered by the positioning shafts 123 and 129 of the processing unit can be reduced, so that the risk of a connection failure and breakage of the drawer connector 42 can be reduced.

Further, the drawer connector 126 on the processing unit can easily fit into the drawer connector 42 on the unit and apparatus main body 100 so that the electrical connection between the unit and apparatus main body 100 can be surely performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-177404, filed Oct. 13, 2023, which is hereby incorporated by reference herein in its entirety.

What is claimed is:

1. An image forming apparatus comprising:

a main unit including an image forming portion configured to form an image on a sheet;

a discharge portion provided on the main unit and configured to discharge the sheet from the main unit in a first direction; and a processing unit installed on an installation surface of the main unit and configured to process the sheet discharged from the discharge portion, wherein the processing unit includes:

a first connector electrically connected to the main unit; and a first guide pin that extends in a second direction crossing the first direction in a state where the processing unit is installed on the installation surface, wherein the main unit includes:

a second connector disposed, in the second direction, on a first side with respect to a sheet discharging position onto which the sheet is discharged from the discharge portion, the second connector being electrically connected to the processing unit in a manner that the first connector is inserted into the second connector along the second direction; and a first guide hole disposed on the first side with respect to the sheet discharging position in the second direction, the first guide pin passing through the first guide hole, and wherein at least a part of the first guide pin is disposed in a position different from a position of the second connector in a third direction crossing both the first direction and the second direction, wherein the main unit further includes:

a connector disposing surface on which the second connector is disposed, the connector disposing surface being disposed on the first side with respect to the sheet discharging position in the second direction, and a discharge portion disposing surface on which the discharge portion is disposed, wherein the installation surface, the connector disposing surface, and the discharge portion disposing surface define an inside space that includes an opening portion on a second side opposite the first side with respect to the sheet discharging position in the second direction, and wherein the processing unit is installed in the inside space.

2. The image forming apparatus according to claim 1, wherein the first guide pin is a cylindrical shaft member that extends in the second direction, and wherein the cylindrical shaft member includes a plane portion at a tip of the cylindrical shaft member in an insertion direction, a diameter of the plane portion being less than an outer diameter of the cylindrical shaft member.

3. The image forming apparatus according to claim 2, wherein an entirety of the plane portion is disposed in the position different from the position of the second connector in the third direction.

4. The image forming apparatus according to claim 2, wherein the cylindrical shaft member includes a tapered portion whose outer diameter becomes less as it becomes closer to the plane portion at the tip in the insertion direction to the first guide hole.

5. The image forming apparatus according to claim 2, wherein the second connector includes a group of terminals and a housing that encloses the group of terminals, and wherein an entirety of the plane portion of the first guide pin is disposed above an upper end of the housing of the second connector in the third direction.

6. The image forming apparatus according to claim 2, wherein the second connector includes a group of terminals and a housing that encloses the group of terminals, and wherein an entirety of the plane portion of the first guide pin is disposed below a lower end of the housing of the second connector in the third direction.

7. The image forming apparatus according to claim 2, wherein the plane portion of the first guide pin has a circular shape and the diameter of the plane portion is equal to or less than half the outer diameter of the cylindrical shaft member.

8. The image forming apparatus according to claim 2, wherein the second connector includes a group of terminals and a housing that encloses the group of terminals, wherein the second connector is supported such that the second connector can be shifted in the third direction for a first distance with respect to the main unit, and wherein the first guide pin is disposed such that the plane portion and the housing of the second connector are distanced from each other in the third direction for a second distance that is greater than the first distance.

9. The image forming apparatus according to claim 1, wherein the processing unit includes a second guide pin that extends in the second direction in a state where the processing unit is installed on the installation surface, wherein the main unit includes a second guide hole that is disposed on the first side with respect to the sheet discharging position in the second direction, the second guide hole being configured such that the second guide pin passes through the second guide hole, wherein at least one portion of the first guide pin is disposed above an upper end of the second connector in the third direction, and wherein at least one portion of the second guide pin is disposed below a lower end of the second connector in the third direction.

10. The image forming apparatus according to claim 1, wherein in the third direction, a center position of the of the first guide pin in the third direction is different from a center position of the second connector in the third direction.

11. An image forming apparatus comprising:

a main unit including an image forming portion configured to form an image on a sheet;

a discharge portion provided on the main unit and configured to discharge the sheet from the main unit in a first direction; and a processing unit installed on an installation surface of the main unit and configured to process the sheet discharged from the discharge portion, wherein the processing unit includes:

a first connector electrically connected to the main unit; and a first guide pin that extends in a second direction crossing the first direction in a state where the processing unit is installed on the installation surface, wherein the main unit includes:

a second connector disposed, in the second direction, on a first side with respect to a sheet discharging position onto which the sheet is discharged from the discharge portion, the second connector being electrically connected to the processing unit in a manner that the first connector is inserted into the second connector along the second direction;

a first guide hole disposed on the first side with respect to the sheet discharging position in the second direction, the first guide pin passing through the first guide hole, and wherein at least a part of the first guide hole is disposed in a position different from a position of the second connector in a third direction crossing both the first direction and the second direction, wherein the main unit further includes:

a connector disposing surface on which the second connector is disposed, the connector disposing surface being disposed on the first side with respect to the sheet discharging position in the second direction, and a discharge portion disposing surface on which the discharge portion is disposed, wherein the installation surface, the connector disposing surface, and the discharge portion disposing surface define an inside space that includes an opening portion on a second side opposite the first side with respect to the sheet discharging position in the second direction, and wherein the processing unit is installed in the inside space.

12. An image forming apparatus comprising:

a main unit including an image forming portion configured to form an image on a sheet; and a discharge portion provided on the main unit and configured to discharge the sheet from the main unit in a first direction, wherein a processing unit configured to process the sheet discharged from the discharge portion is attachable to the image forming apparatus, wherein the main unit includes:

an installation surface on which the processing unit is to be installed, a main body side connector disposed, in a second direction, on a first side with respect to a sheet discharging position onto which the sheet is discharged from the discharge portion, the second direction crossing the first direction, and the main body side connector being configured to be electrically connected to the processing unit when a processing side connector of the processing unit is inserted into the main body side connector along the second direction; and a guide hole disposed on the first side with respect to the sheet discharging position in the second direction, the guide hole being configured such that a guide pin of the processing unit passes through the guide hole, and wherein at least a part of the guide hole is disposed in a position different from a position of the main body side connector in a third direction crossing both the first direction and the second direction, wherein the main unit further includes:

a connector disposing surface on which the main body side connector is disposed, the connector disposing surface being disposed on the first side with respect to the sheet discharging position in the second direction, and a discharge portion disposing surface on which the discharge portion is disposed, wherein the installation surface, the connector disposing surface, and the discharge portion disposing surface define an inside space that includes an opening portion on a second side opposite the first side with respect to the sheet discharging position in the second direction, and wherein the processing unit is installed in the inside space in a state where the processing unit is attached to the image forming apparatus.

13. A processing unit detachably attachable to an image forming apparatus including a main unit, the main unit including (i) an image forming portion configured to form an image on a sheet, (ii) an installation surface on which the processing unit is installable, (iii) a main body side connector disposed, in a second direction crossing a first direction, on a first side with respect to a sheet discharging position onto which the sheet is discharged from a discharge portion provided on the main unit and configured to discharge the sheet from the main unit in the first direction, (iv) a guide hole disposed on the first side with respect to the sheet discharging position in the second direction, (v) a connector disposing surface on which the main body side connector is disposed, the connector disposing surface being disposed on the first side with respect to the sheet discharging position in the second direction, and (vi) a discharge portion disposing surface on which the discharge portion is disposed, wherein the installation surface, the connector disposing surface, and the discharge portion disposing surface define an inside space that includes an opening portion on a second side opposite the first side with respect to the sheet discharging position in the second direction, the processing unit being configured to process the sheet discharged from the discharge portion of the image forming apparatus in the first direction, the processing unit comprising:

a processing unit side connector to be electrically connected to the image forming apparatus when the processing unit side connector is inserted into the main body side connector included in the main unit of the image forming apparatus along the second direction crossing the first direction; and a guide pin that extends in the second direction, the guide pin being configured to pass through the guide hole included in the main unit of the image forming apparatus, wherein at least a part of the guide pin is disposed in a position different from a position of the processing unit side connector in a third direction crossing both the first direction and the second direction, and wherein the processing unit is installed on the installation surface and in the inside space defined by the installation surface, the connector disposing surface, and the discharge portion disposing surface in a state where the processing unit is attached to the image forming apparatus.

* * * * *